United States Patent

[11] 3,622,194

| [72] | Inventor | William Bryk |
| | | Detroit, Mich. |
| [21] | Appl. No. | 888,325 |
| [22] | Filed | Dec. 29, 1969 |
| [45] | Patented | Nov. 23, 1971 |
| [73] | Assignee | Ford Motor Company |
| | | Dearborn, Mich. |

[54] MOTOR VEHICLE BODY MOUNT
6 Claims, 5 Drawing Figs.

[52] U.S. Cl.................................................. 296/35 R,
85/70, 151/41.7, 151/41.75, 248/9, 248/15
[51] Int. Cl.................................................. B62d 27/04
[50] Field of Search.......................................... 296/35 R;
151/41.75, 41.7; 85/70; 248/9, 15; 24/216, 217

[56] References Cited
UNITED STATES PATENTS

| 3,193,237 | 7/1965 | Adams | 295/35 X |
| 3,304,043 | 2/1967 | Beck | 248/9 X |
| 2,538,396 | 1/1951 | Sutin | 24/216 X |
| 3,032,370 | 1/1962 | Moore | 296/35 |
| 3,218,101 | 11/1965 | Adams | 296/35 |
| 3,236,326 | 2/1965 | Reynolds | 248/9 |

*Primary Examiner*—Benjamin Hersh
*Assistant Examiner*—John A. Pekar
*Attorneys*—John R. Faulkner and E. Dennis O'Connor ABSTRACT: A body mount for connecting a motor vehicle body part to the vehicle frame. A pair of resilient, apertured insulators are positioned on either side of the frame with the insulator apertures in registry with a frame aperture. The configurations of the insulators allow them to be interlocked and held in position for preassembly without the aid of a fixture. Upper and lower retaining elements bear on the outer surfaces of the insulators and each retaining element includes a projection extending into the insulator apertures. Formed on these projections are snap action connectors that become engaged upon the retaining elements being moved toward one another during compression and preloading of the insulators. One of the retaining element projections includes a threaded sleeve portion that receives a bolt that extends from the body part.

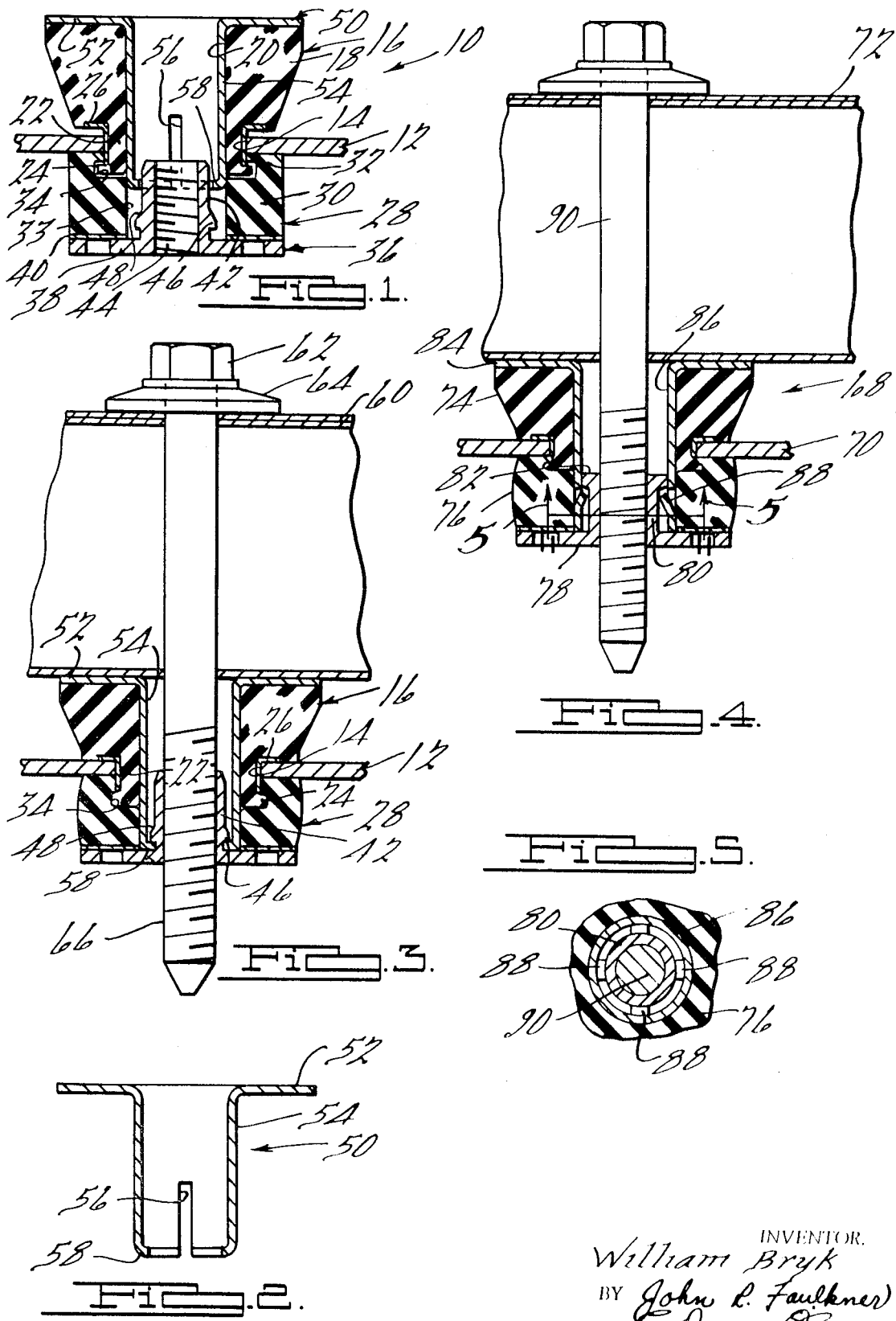

MOTOR VEHICLE BODY MOUNT

BACKGROUND OF THE INVENTION

It is customary to attach a motor vehicle body to the vehicle frame by means of a plurality of spaced body mounts incorporating resilient insulators adapted to insulate the body against frame vibrations and noise. Modern practice includes the expedient of preassembling or premounting body mounts on the vehicle frame. With premounted body mounts, it is necessary only for the assembly line workers in assembling the body to the frame to make a simple insertion of fastening means extending from the body to each body mount.

Body mounts adapted for premounting normally include an upper insulator and a lower insulator. These insulators are positioned on opposite sides of a horizontal frame portion. Upper and lower insulator retaining members are positioned to bear on the outer surfaces of the insulators. A compressing tool is utilized to squeeze the retaining members and urge these members toward one another, thereby compressing and preloading the insulators. With the parts in this condition, the retaining members are staked together. The staking operation completes the premounting operation.

The procedure and structure described above have given rise to two undesirable possibilities. First, prior to the compression and staking steps, the lower insulator and lower retaining member must be held in place against the force of gravity either by a fixture or by hand. If a fixture is used, the expense of this piece is added to the assembly cost and two manual tasks, placing and removing the fixture, are added to the assembly procedure. If the lower insulator and retaining member are held in place manually the task required of the compression and staking tool operator greatly is complicated.

The second undesirable situation that may arise is a slight axial misalignment of the parts to be staked together. Such a misalignment greatly may decrease the reliability of the staked connection and result in the failure of this connection.

It is an object of this invention to provide a motor vehicle body mount that may be premounted to the vehicle frame and that eliminates the possibility of the two undesirable situations described above. In particular, the body mount of this invention provides that the lower insulator and retaining member are held in place prior to compression of the insulator without the need for a fixture or manual assistance. Also, the staking operation is eliminated as integral, snap action connecting means are formed on the retaining members. These connecting means automatically become engaged when the retaining members are moved toward one another during compression of the insulators.

SUMMARY OF THE INVENTION

A body mount constructed in accordance with this invention is adapted for connecting a motor vehicle body part to a motor vehicle frame part having an aperture extending therethrough. The body mount includes a pair of apertured, resilient insulators positioned on opposite sides of the frame part with the apertures of the insulators in registry with the frame part aperture. One of the insulators has integrally formed male connection means extending therefrom and through the aperture in the frame part. The other of the insulators has a female connection means formed therein adapted to receive male connection means so that the insulators are held together. A pair of retaining members bear on the outer sides of the insulators. Each of the retaining members includes projection means extending therefrom into the apertures of the insulators. Cooperating snap action connecting means are formed on the projection means. The connecting means are spaced apart when the resilient insulators are in an undeformed condition. The retaining members are movable towards one another to deform the insulators and this movement causes the cooperating snap-action connecting means to lock into engagement such that the insulators are held in a compressed position. Fastener means interconnect the body part to one of the projection means.

DESCRIPTION OF THE DRAWING

FIG. 1 is a side elevation view, in section, of the motor vehicle body mount of this invention prior to the preassembly step of compressing the body mount insulators;

FIG. 2 is a side elevation view, in section, of the upper retaining member of the motor vehicle body mount of FIG. 1;

FIG. 3 is a view similar to FIG. 1 but illustrating the motor vehicle body mount in the completely assembled condition wherein said body mount secures a vehicle frame part to a vehicle body part;

FIG. 4 is a view similar to FIG. 3 but illustrating a second embodiment of the motor vehicle body mount of this invention; and FIG. 5 is a sectional view taken along the line 5—5 of FIG. 4.

DETAILED DESCRIPTION OF THE INVENTION

Referring now in detail to the drawing and in particular to FIG. 1 thereof, the numeral 10 denotes in general a vehicle body mount according to this invention and arranged on a vehicle frame part prior to the preassembly or premounting of the body mount. The vehicle frame part is identified by the numeral 12 and consists of a generally horizontal section of structural material having an aperture 14 formed therethrough. An upper body insulator 16, formed from rubber or other suitable resiliently deformable material, is positioned generally above the frame part 12. Insulator 16 includes a main body 18 having an aperture 20 extending therethrough. An integrally formed sleeve 22 extends from the bottom portion of main body 18 through the aperture 14 and has an outwardly extending flange 22 formed on the end thereof remote from the main body 18. Surrounding sleeve 22 near the intersection of the sleeve and main body 18 is a metal collar 26. This collar protects the resiliently deformable material of the insulator 16 from wear and destruction due to chafing by frame part 12 against this material. The frame part 12 cannot deleteriously affect the metal collar 26 if relative movement occurs between these parts.

A lower insulator 28 is positioned generally below the frame part 12 and is constructed of the same material as insulator 16. Insulator 28 includes a main body 30 having an integrally formed sleeve 32 extending upwardly therefrom. An aperture 33 extends through the insulator 28. A recess or groove 34 is formed in the inside wall of the sleeve 32.

It may be seen from FIG. 1 that upper insulator 16 and lower insulator 28 are positioned such that the apertures 20 and 33 are aligned axially with one another and register with the aperture 14 formed through the frame part 12. Also, the positioning of the insulators 16 and 28 is such that flange 24 formed on sleeve 22 of upper insulator 16 is received in the groove 34 formed in the sleeve 32 of lower insulator 28. The reception of this flange in the lower insulator groove effectively holds the insulators together so the lower insulator 28 is retained in the position illustrated in FIG. 1 of the drawing against the force of gravity without the need for a fixture to support it in this position or for manual support.

The interlocking of the two insulators simply and effectively can be accomplished by hand by a workman forcing the deformable sleeve 22 of the upper insulator through the aperture 14 in frame part 12 and into the aperture 33 in the lower insulator. As sleeve 22 is forced into aperture 33, flange 24 will be deformed until it is received in groove 34 at which time it will return to its original shape as illustrated and the two retainers will be locked together.

A lower retainer 36 has a generally flat plate portion 38 secured to the outer surface of insulator 28 by an adhesive layer 40. It thus may be appreciated that the lower retainer 36 will be held in the position illustrated without need for a fixture or manual support since it is attached to the lower insulator 28 that is interlocked with the upper insulator. Extending from plate portion 28 into insulator aperture 33 is an integrally formed retainer sleeve 42. The internal surface of sleeve 42 has threads 44 formed thereon. The external surface of sleeve 42 has a shoulder 46 formed thereon. The shoulder 46 includes an inclined surface 48 facing upwardly.

Referring now to both FIGS. 1 and 2 of the drawing, there can be seen an upper retainer 50 having a generally flat plate portion 52 bearing on the outer surface of upper insulator 16. A sleeve 54 is integrally formed with portion 52 and extends therefrom into aperture 20 of insulator 16. Upper retainer 50 is formed from spring steel or other resiliently deformable material. A plurality of grooves 56 (one shown) extend from the end of sleeve 54 remote from plate portion 52 and divide sleeve 54 into a plurality of spring fingers. An inwardly directed flange 58 is formed on the end of sleeve 54 remote from plate portion 52.

It may be seen from FIG. 1 that sleeves 54 and 42 are dimensioned such that sleeve 42 is received in telescoping relationship within sleeve 54. The clearance between the outer surface of sleeve 42 and the inwardly directed flange 58 of sleeve 54 is quite small.

During the assembly of a motor vehicle, the parts illustrated in FIG. 1 are positioned as illustrated by hand preparatory to the premounting of the body mount 10 on the frame part 12. Subsequent to the positioning of the parts as they are shown in FIG. 1, a compressing tool is used that bears on the outer surface of upper retainer member 50 and the outer surface of lower retainer member 36. The compressing tool forces the two retainer members toward one another causing a compression or preloading and deformation of the resiliently deformable insulators 16 and 28.

As the upper and lower retainers 50 and 36, respectively, move toward one another, flange 58 formed on upper retainer sleeve 54 is forced along the inclined surface 48 of shoulder 46 so that the spring fingers formed on sleeve 54 are separated. This separation allows flange 58 to slide over shoulder 46. Once the flange 58 has moved past the shoulder 46, as illustrated in FIG. 3 of the drawing, the resiliently deformable material from which upper retainer 50 is constructed causes the spring fingers of sleeve 54 to snap into place around shoulder 46. The upper and lower retainers thus are locked into place. It can be appreciated that the interlocking elements on the upper and lower retainer sleeves constitute snap action connecting means. No permanent deformation of the retainers is needed to lock these elements together merely the use of a compressing tool as is well known in the art.

Subsequent to the compressing and interlocking operation described above, the premounted body mount parts are ready for the assembly of a body member to the frame member 12. In FIG. 3, the body member is identified by the numeral 60 and it readily may be seen that a body member 60 has a bolt 62 passing therethrough. The bolt 62 also extends through a washer 64. The shank of bolt 62 has a threaded portion 66, the threads of which mate with the threads 44 formed on the interior surface of lower retainer sleeve 42.

The final assembly of body part 60 to frame part 12 thus consists merely of aligning these members so that the shank of bolt 62 is received within sleeve 42 so that the threads formed on these members cooperate to hold the parts in the position illustrated in FIG. 3.

FIGS. 4 and 5 of the drawing illustrate a second embodiment of body mount constructed in accordance with this invention and identified by the numeral 68. The body mount 68 is adapted to interconnect a motor vehicle frame part 70 with a vehicle body part 72. FIG. 4 of the drawing shows these parts in the assembled position.

The body mount 68 includes an upper insulator 74 and a lower insulator 76 identical to the upper and lower insulators 16 and 28 of FIGS. 1 and 3. A lower retainer 78, suitably adhesively bonded to the outer surface of lower retainer 76 has an integrally formed sleeve 80 extending upwardly into the aperture of lower retainer 76. An outwardly directed flange 82 is formed on the end of sleeve 80 positioned within the insulator aperture. An upper retainer 84 bears on the outer surface of upper insulator 74 and has an integrally formed sleeve 86 extending into the insulator apertures. Lower retainer sleeve 80 is received telescopically within upper retainer sleeve 86.

The upper retainer sleeve 86 has formed thereon and extending into the central opening thereof a plurality of spring lances 88. These lances are cut from the material of sleeve 86 and are resiliently deformable since upper retainer 84 is constructed of resiliently deformable material such as spring steel. It readily may be appreciated that when a compression tool is utilized to force lower retainer 78 and upper retainer 84 towards one another, the flange 82 formed on lower retainer sleeve 80 will cause the lances 88 to be deformed outwardly until the flange 82 has moved past these lances, whereupon the lances will spring into the positions shown in FIG. 4 thereby locking the two retainers together. Flange 82 and lances 88 thus comprise snap action connecting means for the upper and lower retainers of the motor vehicle body mount 68. A bolt 90 that extends through body member 72 thus may be threadably received within sleeve 80 in order to complete the assembly of the body member 72 to the frame part 70.

This invention provides a motor vehicle body mount that may be premounted to a vehicle frame part without the need for either a fixture or manual assistance to hold the parts of the body mount in place prior to preassembly. Also, no permanent deformation operation such as staking need be accomplished to lock the upper and lower retainers of the body mount in place. The need for such an operation is obviated by the engagement of a snap action connecting means that automatically becomes engaged during the compression or preloading of the body mount insulators.

I claim:

1. A body mount for connecting a motor vehicle body part to a motor vehicle frame part having an aperture extending therethrough, said body mount including a pair of apertured resilient insulators positioned on opposite sides of said frame part with the apertures of said insulators in registry with the frame part aperture, a first one of said insulators having an integrally formed sleeve extending therefrom through the aperture in said frame part and having an outwardly directed flange thereon, the second one of said insulators having a groove formed in the wall that defines the aperture through said second insulator adapted to receive said outwardly directed flange of said first insulator therein to secure said insulators together, a pair of retaining members bearing on the outer sides of said insulators, cooperating snap action connecting means formed on said retaining members, extending into the apertures in said insulators, and capable of locking said retaining members together, and fastener means interconnecting said body to at least one of said snap action connecting means.

2. A body mount for connecting a motor vehicle body part to a motor vehicle frame part having an aperture extending therethrough, said body mount including a pair of apertured resilient insulators positioned on opposite sides of said frame part with the apertures of said insulators in registry with the frame part aperture, cooperating first and second interlocking means formed on said insulators and securing said insulators together, said first interlocking means extending from one of said insulators through said frame part aperture to the other of said insulators, a pair of retaining members bearing on the outer sides of said insulators, said retaining members having coaxial sleeves extending therefrom into the apertures of said insulators, and third and fourth interlocking means formed on said sleeves and capable of becoming secured to one another, said third and fourth interlocking means being spaced apart when said insulators are in an undeformed condition, said retaining members being movable toward one another to deform said insulators and cause said second and third interlocking means to come together and become secured to one another to hold said insulators in a deformed condition.

3. A body mount according to claim 2, wherein said body is positioned adjacent one of said retaining members and further including fastener means extending from said body part through said sleeves, and fifth and sixth interlocking means formed on said fastener means and one of said sleeves and cooperating to join said fasteners and said one sleeve together.

4. A body mount according to claim 3, wherein said first means comprises a sleeve integrally formed with and extending from one of said insulators through said frame part aperture and into the aperture of said other insulator, said sleeve having an outwardly extending flange formed thereon, said second means comprising a recess formed into the aperture defining surface of said other insulator and adapted to receive said flange.

5. A body mount according to claim 3, wherein said third means comprises a shoulder extending about one of said coaxial sleeves and having an inclined surface, the other of said coaxial sleeves having plural longitudinal slats extending therealong separating said sleeve into distinct finger portions, the other of said sleeves being formed from spring steel such that said finger portions are resiliently separable, each of said finger portions having inwardly extending flanges extending therefrom adapted to move in contact with said inclined surface to separate said finger portions such that said finger portions engage said shoulder in a snap action manner as said retaining members are moved toward one another, said finger portions comprising said third means.

6. A body mount according to claim 3, wherein said fastener means includes an elongated shaft and said fifth means comprise threads on said shaft, and said sixth means includes mating threads formed on the internal surface of said one of said sleeves.

* * * * *